(12) United States Patent
Kim et al.

(10) Patent No.: US 7,985,352 B2
(45) Date of Patent: Jul. 26, 2011

(54) PHOSPHOR FOR PLASMA DISPLAY PANEL AND PLASMA DISPLAY PANEL USING THE SAME

(75) Inventors: Ji-Hyun Kim, Suwon-si (KR); Dong-Sik Zang, Suwon-si (KR); Young-Chul You, Suwon-si (KR); Ick-Kyu Choi, Suwon-si (KR); Mi-Ran Song, Suwon-si (KR); Hyun-Deok Lee, Suwon-si (KR); Yu-Mi Song, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 703 days.

(21) Appl. No.: 12/069,958

(22) Filed: Feb. 13, 2008

(65) Prior Publication Data

US 2008/0199729 A1 Aug. 21, 2008

(30) Foreign Application Priority Data

Feb. 16, 2007 (KR) ........................ 10-2007-0016754

(51) Int. Cl.
*C09K 11/80* (2006.01)
*C09K 11/63* (2006.01)
*C09K 11/66* (2006.01)
*C09K 11/54* (2006.01)
*C09K 11/55* (2006.01)

(52) U.S. Cl. .... 252/301.6 R; 252/301.4 R; 252/301.6 F; 313/582; 313/584; 313/487

(58) Field of Classification Search ........... 252/301.4 R, 252/301.6 F, 301.6 R; 313/582, 584, 486, 313/487
See application file for complete search history.

(56) References Cited

U.S. PATENT DOCUMENTS

| 2005/0151460 A1 * | 7/2005 | Yoshida et al. ............... 313/486 |
| 2006/0017385 A1 * | 1/2006 | Tanaka et al. ................ 313/582 |
| 2006/0017384 A1 | 6/2006 | Setoguchi et al. |

FOREIGN PATENT DOCUMENTS

| EP | 1705233 | * | 9/2006 |
| EP | 1705233 A1 | | 9/2006 |
| EP | 1903088 A2 | | 9/2007 |
| JP | 2001-172626 | * | 6/2001 |
| JP | 2003096448 A | | 4/2003 |
| JP | 2005187587 A | | 7/2005 |
| JP | 2006274033 A | | 10/2006 |

OTHER PUBLICATIONS

Li, Xiao X. and Yu H. Wang, *Materials Chemistry and Physics*, 101-1:191-194, 2006, "Synthesis and Photoluminescence properties of $(Y,Gd)Al^3(BO_3)_4$:$Tb^{3+}$ under VUV excitation."

* cited by examiner

*Primary Examiner* — C. Melissa Koslow

(74) *Attorney, Agent, or Firm* — Knobbe Martens Olson & Bear LLP

(57) ABSTRACT

Provided are a phosphor used in a PDP, which is a compound represented by Formula 1 below and a PDP including a phosphor layer comprising the phosphor.

$$(Y_{1-x-y}Gd_xTb_y)Al_rQ_{3-r}(BO_3)_4 \quad \text{Formula 1}$$

where $0<x\leq1$, $0<y\leq1$, Q is Sc, In, or Ga, and $0\leq r<3$.

When the phosphor is used to form a green phosphor layer of a PDP, the luminance saturation problem of a conventional green phosphor can be overcome. In addition, a PDP including a phosphor layer comprising the phosphor has a wider color reproduction range and no reduction in luminance according to the mixing ratio of each phosphor contained in the phosphor compared with a conventional phosphor used in a PDP. Therefore, a PDP including a phosphor layer comprising the phosphor can have far superior image qualities.

10 Claims, 4 Drawing Sheets

PHOSPHOR FOR PLASMA DISPLAY PANEL AND PLASMA DISPLAY PANEL USING THE SAME

CROSS-REFERENCE TO RELATED PATENT APPLICATION

This application claims the benefit of Korean Patent Application No. 10-2007-0016754, filed on Feb. 16, 2007, in the Korean Intellectual Property Office, the disclosure of which is incorporated herein in its entirety by reference.

BACKGROUND OF THE INVENTION

1. Field of the Invention

The present embodiments relate to a phosphor used in a plasma display panel (PDP) and a PDP using the same, and more particularly, to a phosphor for a PDP, which is excited by vacuum ultraviolet rays to emit light, having reduced luminance saturation degree, and a PDP including a phosphor layer comprising the same.

2. Description of the Related Art

In plasma display devices, for example, plasma display panels (PDPs), a phosphor layer is excited by an excitation light having a vacuum ultraviolet (VUV) light wavelength of about 147-200 nm generated by exciting Xe or the like as a discharge gas.

$Zn_2SiO_4$:Mn (hereinafter, referred to as "P1") and $YBO_3$:Tb (hereinafter, referred to as "YB") are conventional green phosphors that are widely used in PDPs, and can be used in combination with an appropriate mixing ratio. The reason why these two green phosphors are mixed is because P1 has higher color purity and luminance than those of YB, but P1 has luminance saturation characteristics at high gradation while a PDP operates. On the other hand, YB has less luminance saturation characteristics compared with P1.

Luminance saturation of a phosphor is known to be related to afterglow time. The conventional green phosphor P1 has an afterglow time of about 7 ms when vacuum ultraviolet rays having a wavelength of around 147 nm are irradiated thereon, and the conventional green phosphor YB has an afterglow time of around 10 ms under the same condition as described above.

Luminance saturation is an important factor that expresses the gradation of a PDP screen and determines image quality, thereby being recognized as a critical issue.

However, phosphors having satisfactory properties such as excellent color purity and luminance, and having little luminance saturation have not yet been developed, and thus there is still an urgent need for improvement. The present embodiments solve the above-described problems as well as provide additional advantages.

SUMMARY OF THE INVENTION

The present embodiments provide a phosphor used in a PDP, having excellent luminance and color purity, and having reduced luminance saturation degree, and a PDP comprising the phosphor.

According to an aspect of the present embodiments, there is provided a phosphor used in a PDP, which is a compound represented by Formula 1 below.

$(Y_{1-x-y}Gd_xTb_y)Al_rQ_{3-r}(BO_3)_4$     Formula 1 where $0<x\leq1$, $0<y\leq1$, Q is Sc, In, or Ga, and $0\leq r\leq3$

The compound represented by Formula 1 is $(Y_{0.2}Gd_{0.4}Tb_{0.4})Al_3(BO_3)_4$,  where x=0.5, y=0.2 and r=3, $\{(Y_{0.3}Gd_{0.5}Tb_{0.2})Al_3(BO_3)_4\}$, $(Y_{1-x-y}Gd_xTb_y)Al_3(BO_3)_4$ where x=0.6, y=0.3 and r=3), $\{(Y_{0.1}Gd_{0.6}Tb_{0.3})Al_3(BO_3)_4\}$, $(Y_{1-x-y}Gd_xTb_y)Al_3(BO_3)_4$ where x=0.6, y=0.4 and r=3, $\{(Gd_{0.6}Tb_{0.4})Al_3(BO_3)_4\}$, $(Y_{0.2}Gd_{0.4}Tb_{0.4})Al_{2.95}Sc_{0.05}(BO_3)_4$, $(Y_{0.2}Gd_{0.4}Tb_{0.4})Al_{2.9}Sc_{0.1}(BO_3)_4$, $(Y_{0.2}Gd_{0.4}Tb_{0.4})Al_{2.8}Sc_{0.2}(BO_3)_4$, $(Y_{0.2}Gd_{0.4}Tb_{0.4})Al_{2.5}Sc_{0.5}(BO_3)_4$, $(Y_{0.2}Gd_{0.4}Tb_{0.4})Al_{2.95}In_{0.05}(BO_3)_4$, $(Y_{0.2}Gd_{0.4}Tb_{0.4})Al_{2.9}In_{0.1}(BO_3)_4$, $(Y_{0.2}Gd_{0.4}Tb_{0.4})Al_{2.8}In_{0.2}(BO_3)_4$, $(Y_{0.2}Gd_{0.4}Tb_{0.4})Al_{2.5}In_{0.5}(BO_3)_4$, $(Y_{0.2}Gd_{0.4}Tb_{0.4})Al_{2.95}Ga_{0.05}(BO_3)_4$, $(Y_{0.2}Gd_{0.4}Tb_{0.4})Al_{2.9}Ga_{0.1}(BO_3)_4$, $(Y_{0.2}Gd_{0.4}Tb_{0.4})Al_{2.8}Ga_{0.2}(BO_3)_4$, or $(Y_{0.2}Gd_{0.4}Tb_{0.4})Al_{2.5}Ga_{0.5}(BO_3)_4$.

According to another aspect of the present embodiments, there is provided a phosphor used in a PDP comprising: a first phosphor that is a compound represented by Formula 1 below; and a second phosphor that is at least one phosphor selected from the group consisting of a phosphor represented by Formula 2A or 2B, a phosphor represented by Formula 3 below and a phosphor represented by Formula 4 below.

$(Y_{1-x-y}Gd_xTb_y)Al_rQ_{3-r}(BO_3)_4$     Formula 1 where $0<x\leq1$, $0<y\leq1$, Q is Sc, In, or Ga, and $0\leq r\leq3$

$BaMgAl_{10}O_{17}$:Mn     Formula 2A $BaMgAl_{12}O_{19}$:Mn     Formula 2B

$Li_2Zn(Ge,\theta)_2O_8$:Mn     Formula 3 where $\theta$=Al or Ga,
$3\leq Z\leq4$,

$Zn_2SiO_4$:Mn     Formula 4

The amount of the second phosphor is 10-90 parts by weight based on 100 parts by weight of the total amount of the first phosphor and the second phosphor.

According to other aspects the second phosphor is a phosphor represented by Formula 2A or 2B.

According to other aspects the second phosphor is a phosphor represented by Formula 3.

According to other aspects the phosphor of Formula 3 is $Li_2Zn(Ge,Al)_3O_8$ or $Li_2Zn(Ge,Ga)_3O_8$.

According to other aspects the first phosphor is $(Y_{0.2}Gd_{0.4}Tb_{0.4})Al_3(BO_3)_4$, $(Y_{0.3}Gd_{0.5}Tb_{0.2})Al_3(BO_3)_4$, $(Y_{0.1}Gd_{0.6}Tb_{0.3})Al_3(BO_3)_4$, $(Gd_{0.6}Tb_{0.4})Al_3(BO_3)_4$, $(Y_{0.2}Gd_{0.4}Tb_{0.4})Al_{2.95}Sc_{0.05}(BO_3)_4$, $(Y_{0.2}Gd_{0.4}Tb_{0.4})Al_{2.9}Sc_{0.1}(BO_3)_4$, $(Y_{0.2}Gd_{0.4}Tb_{0.4})Al_{2.8}Sc_{0.2}(BO_3)_4$, $(Y_{0.2}Gd_{0.4}Tb_{0.4})Al_{2.5}Sc_{0.5}(BO_3)_4$, $(Y_{0.2}Gd_{0.4}Tb_{0.4})Al_{2.95}In_{0.05}(BO_3)_4$, $(Y_{0.2}Gd_{0.4}Tb_{0.4})Al_{2.9}In_{0.1}(BO_3)_4$, $(Y_{0.2}Gd_{0.4}Tb_{0.4})Al_{2.8}In_{0.2}(BO_3)_4$, $(Y_{0.2}Gd_{0.4}Tb_{0.4})Al_{2.5}In_{0.5}(BO_3)_4$, $(Y_{0.2}Gd_{0.4}Tb_{0.4})Al_{2.95}Ga_{0.05}(BO_3)_4$,  $(Y_{0.2}Gd_{0.4}Tb_{0.4})Al_{2.9}Ga_{0.1}(BO_3)_4$, $(Y_{0.2}Gd_{0.4}Tb_{0.4})Al_{2.8}Ga_{0.2}(BO_3)_4$, or $(Y_{0.2}Gd_{0.4}Tb_{0.4})Al_{2.5}Ga_{0.5}(BO_3)_4$, the second phosphor is a phosphor represented by Formula 2A or 2B, and the amount of the second phosphor is 10-90 parts by weight based on 100 parts by weight of the total amount of the first phosphor and the second phosphor.

According to another aspect of the present embodiments, there is provided a PDP comprising a phosphor layer comprising the phosphor used in a PDP as described above.

The PDP comprises a transparent front substrate; a rear substrate which is parallel to the transparent front substrate; light-emitting cells defined by barrier ribs disposed between the transparent front substrate and the rear substrate; address electrodes extending in a first direction to correspond to the light-emitting cells; a rear dielectric layer covering the address electrodes; phosphor layers disposed inside the light-emitting cells; pairs of sustain electrodes extending in a second direction and crossing the address electrodes; a front dielectric layer covering the pairs of sustain electrodes; and a discharge gas filled inside the light-emitting cells.

BRIEF DESCRIPTION OF THE DRAWINGS

The above and other features and advantages of the present embodiments will become more apparent by describing in detail exemplary embodiments thereof with reference to the attached drawings in which.

DETAILED DESCRIPTION OF THE INVENTION

Figure 1:
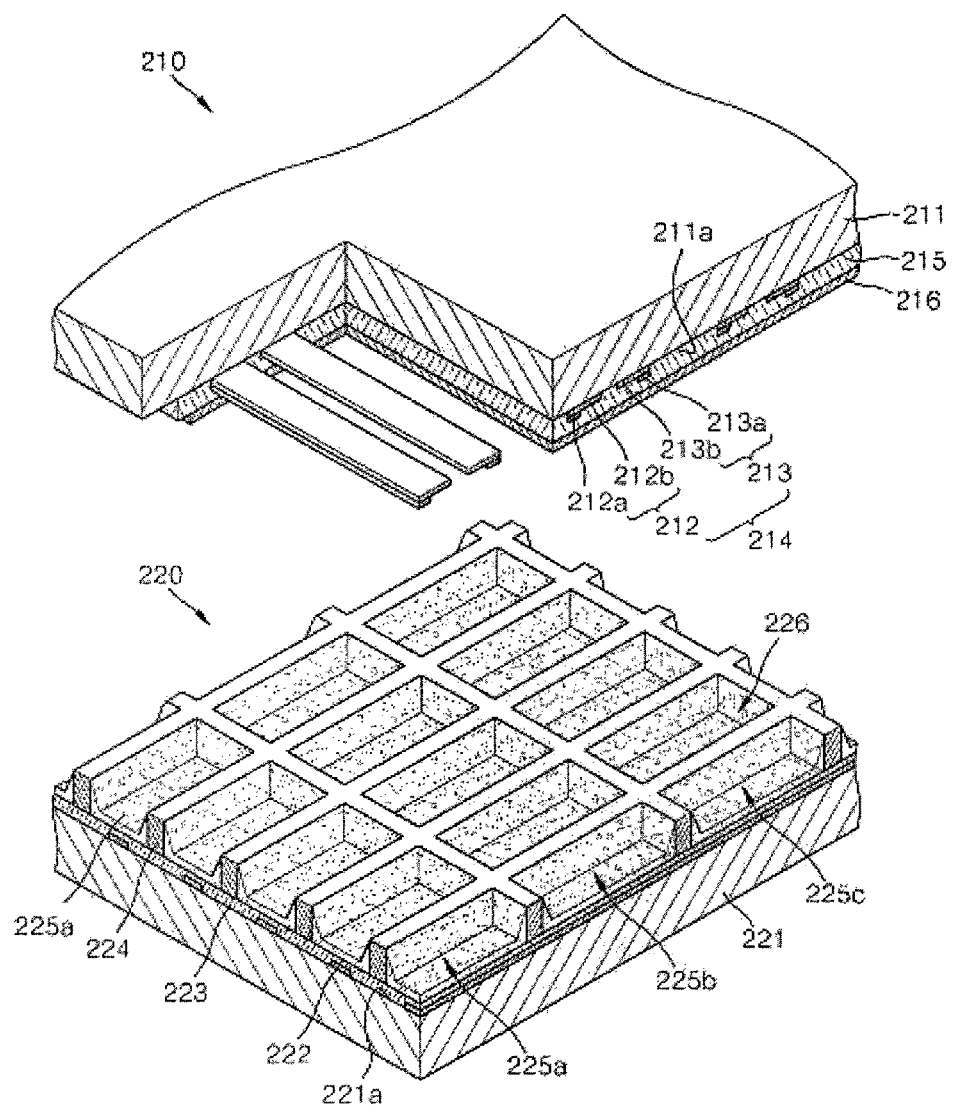
FIG. 1 is a schematic perspective view of a PDP according to an embodiment.

The present embodiments will now be described more fully with reference to the accompanying drawings.

The present embodiments provide a phosphor used in a PDP, represented by Formula 1 below (hereinafter, referred to as "YGAB").

$$(Y_{1-x-y}Gd_xTb_y)Al_rQ_{3-r}(BO_3)_4 \quad \text{Formula 1}$$

where $0<x\leq1$, $0<y\leq1$, Q is Sc, In, or Ga, and $0\leq r\leq3$.

x, y may be selected to satisfy $0<x+y\leq1$

YGAB has a short afterglow time, and a low luminance saturation degree when irradiated with vacuum ultraviolet rays.

Examples of the phosphor represented by Formula 1 include $(Y_{0.2}Gd_{0.4}Tb_{0.4})Al_3(BO_3)_4$, $(Y_{0.3}Gd_{0.5}Tb_{0.2})Al_3(BO_3)_4$, $(Y_{0.1}Gd_{0.6}Tb_{0.3})Al_3(BO_3)_4$, $(Gd_{0.6}Tb_{0.4})Al_3(BO_3)_4$, $(Y_{0.2}Gd_{0.4}Tb_{0.4})Al_{2.95}Sc_{0.05}(BO_3)_4$, $(Y_{0.2}Gd_{0.4}Tb_{0.4})Al_{2.9}Sc_{0.1}(BO_3)_4$, $(Y_{0.2}Gd_{0.4}Tb_{0.4})Al_{2.8}Sc_{0.2}(BO_3)_4$, $(Y_{0.2}Gd_{0.4}Tb_{0.4})Al_{2.5}Sc_{0.5}(BO_3)_4$, $(Y_{0.2}Gd_{0.4}Tb_{0.4})Al_{2.95}In_{0.05}(BO_3)_4$, $(Y_{0.2}Gd_{0.4}Tb_{0.4})Al_{2.9}In_{0.2}(BO_3)_4$, $(Y_{0.2}Gd_{0.4}Tb_{0.4})Al_{2.5}In_{0.5}(BO_3)_4$, $(Y_{0.2}Gd_{0.4}Tb_{0.4})Al_{2.95}Ga_{0.05}(BO_3)_4$, $(Y_{0.2}Gd_{0.4}Tb_{0.4})Al_{2.9}Ga_{0.1}(BO_3)_4$, $(Y_{0.2}Gd_{0.4}Tb_{0.4})Al_{2.5}Ga_{0.2}(BO_3)_4$, or $(Y_{0.2}Gd_{0.4}Tb_{0.4})Al_{2.5}Ga_{0.5}(BO_3)_4$, and mixtures thereof.

In addition, the present embodiments also provide a phosphor used in a PDP, including a first phosphor that is the phosphor represented by Formula 1 as described above, and a second phosphor that is at least one phosphor selected from the group consisting of a phosphor represented by Formula 2A or 2B, a phosphor represented by Formula 3 below and a phosphor represented by Formula 4.

$$BaMgAl_{10}O_{17}:Mn \quad \text{Formula 2A}$$

$$BaMgAl_{12}O_{19}:Mn \quad \text{Formula 2A}$$

$$Li_2Zn(Ge,\theta)_zO_8:Mn \quad \text{Formula 3}$$

where $\theta$=Al, Ga, In or Ti,
$3\leq Z\leq4$, $$Zn_2SiO_4:Mn \quad \text{Formula 4}$$

The first phosphor has a shorter afterglow time than those of conventional green phosphors $Zn_2SiO_4$:Mn (hereinafter, referred to as "P1") and $YBO_3$:Tb (hereinafter, referred to as "YB"), and thus a PDP comprising the first phosphor is highly advantageous in operation. The second phosphor can be a phosphor having excellent color purity.

Among the second phosphors described above, the phosphor represented by Formula 2A, 2B or 3 has generally the same luminance as that of P1 and excellent color purity. P1 is the most commonly used phosphor in PDPs. In addition, the phosphor of Formula 3 has shorter afterglow time than that of P1, and thus when the phosphor of Formula 3 is used in combination with YGAB, that is, the phosphor of Formula 1, it has excellent luminance and color purity, and little luminance saturation. Therefore, a PDP with improved image quality can be manufactured.

In the phosphor for a PDP according to the present embodiments, the amount of the second phosphor may be preferably from about 10 to about 90 parts by weight based on 100 parts by weight of the total amount of the first phosphor and the second phosphor, more preferably from about 30 to about 70 parts by weight and most preferably about 50 parts by weight. When the amount of the second phosphor is less than 10 parts by weight based on 100 parts by weight of the total amount of the first phosphor and the second phosphor, the phosphor has lower color purity. When the amount of the second phosphor is greater than 90 parts by weight based on 100 parts by weight of the total amount of the first phosphor and the second phosphor, the phosphor has long afterglow time, and thus is more likely to have luminance saturation.

The phosphor of Formula 3 can be, for example, $Li_2Zn(Ge,Al)_3O_8$:Mn or $Li_2Zn(Ge,Ga)_3O_8$:Mn.

When a phosphor according to an embodiment, comprising the mixture of a phosphor of Formula 1 as a first phosphor and a phosphor of Formula 2A or 2B as a second phosphor is used, the mixing weight ratio of the phosphor of Formula 1 to the phosphor of Formula 2A or 2B may be preferably from about 1:9 to about 9:1, more preferably from about 3:7 to about 7:3, and most preferably about 5:5.

A method of preparing a phosphor, more specifically, YGAB, used in a PDP according to an embodiment will now be described in detail.

$Y_2O_3$, $Gd_2O_3$, $Al_2O_3$, $H_3BO_3$ and $Tb_4O_7$ in a molar ratio of about 1-x-y:x:3:4:y are mixed, and then a solvent is added to the mixture and mixed together. Herein, x is in the range of $0<x\leq1$, and y is in the range of $0.01\leq y<1$.

The solvent can be pure water, alcohol or a mixture thereof, and the amount of the solvent may be from about 30 to about 50 parts by weight based on 100 parts by weight of $Y_2O_3$.

The mixture is filtered, and the solvent is separated and evaporated. The resultant is then sintered under an air atmosphere to completely burn the organic material. As a result, a phosphor represented by Formula 1 can be obtained.

The sintering temperature may be from about 1000 to about 1300° C., and preferably about 1150° C. When the sintering temperature is less than 1000° C., the phase stability of the phosphor represented by Formula 1 is unstable. When the sintering temperature is greater than 1300° C., the temperature comes close to the melting point of the phosphor. In addition, the sintering time is dependent on the sintering temperature, and can be from about 1 to about 10 hours.

A method of preparing a phosphor represented by Formula 2A or 2B will now be described in detail.

A phosphor of Formula 2A or 2B can be prepared in the same manner as that of preparing the phosphor of Formula 1, except that $BaCO_3$, $Al_2O_3$, MgO and $MnCO_3$ in a molar ratio of about 1-Z:10:1:Z where $0<Z\leq0.5$ are mixed, and then the mixture is sintered under a reducing atmosphere at a temperature of from about 1000 to about 1600° C., and preferably a temperature of about 1550° C. for from about 1 to about 10 hours, and preferably about 2 hours.

A method of preparing a phosphor represented by Formula 3 will now be described in detail. The phosphor of Formula 3 can be prepared in the same manner as that of preparing the phosphor of Formula 1 as described above, except that $Li_2CO_3$, ZnO, $GeO_2$, $Al_2O_3$ (or $Ga_2O_3$), and $MnCO_3$ in a molar ratio of 2-y:1:x:x:y where $3 \leq x \leq 4$, $0.03 \leq y \leq 1$ are mixed, and a sintering process is performed as follows.

The sintering process comprises a first sintering process and a second sintering process. The first sintering process is performed at a temperature of from about 800 to about 1000° C., and preferably at a temperature of about 900° C. for from about 1 to about 10 hours, and preferably about 2 hours. The second sintering process is performed under a nitrogen gas atmosphere comprising less than about 5 volume % of hydrogen, and preferably from about 0.5 to about 3 volume % at a temperature of from about 800 to about 1050° C., and preferably at a temperature of about 950° C. for about 2 hours. As a result, a phosphor having a composition formula of $Li_2Zn(Ge,Al)_3O_8$:Mn or $Li_2Zn(Ge,Ga)_3O_8$:Mn can be obtained.

A method of preparing a phosphor represented by Formula 4 will now be described in detail. ZnO, $SiO_2$, and $MnCO_3$ in a molar ratio of about 2-x:1:x where $0.05 \leq x \leq 0.15$ are mixed. Subsequently, the mixture is sintered under a reducing atmosphere at a temperature of from about 1,000 to about 1,300° C., and preferably at a temperature of about 1200° C. for from about 1 to about 10 hours, and preferably for about 2 hours. Here, the reducing atmosphere includes nitrogen gas comprising less than about 5 volume % of hydrogen. Preferably, the reducing atmosphere includes about 95 volume % of $N_2$ and about 5 volume % of $H_2$. After the sintering process, a process of washing using an acid with an appropriate concentration and a ball mill process are performed to prepare a phosphor of Formula 4.

Particles of phosphor used in a PDP according to the present embodiments may have an average diameter of from about 0.5 to about 7 μm. When the average diameter of the phosphor particles is outside this range it is difficult to have high working efficiency in the packaging of powders.

A PDP including a phosphor layer comprising the phosphor according to the present embodiments will now be described in detail.

A PDP according to the present embodiments includes a transparent front substrate; a rear substrate which is parallel to the transparent front substrate; light-emitting cells defined by barrier ribs disposed between the transparent front substrate and the rear substrate; address electrodes extending in a first direction to correspond to the light-emitting cells; a rear dielectric layer covering the address electrodes; phosphor layers disposed inside the light-emitting cells; pairs of sustain electrodes extending in a second direction and crossing the address electrodes; a front dielectric layer covering the pairs of sustain electrodes; and a discharge gas filled inside the light-emitting cells. A PDP having this structure will now be described more fully with reference to FIG. 1.

FIG. 1 is a perspective view illustrating a PDP according to an embodiment. Referring to FIG. 1, the PDP includes a front panel 210 and a rear panel 220.

The front panel 210 includes a front substrate 211, a plurality of pairs of sustain electrodes 214 that are disposed on a bottom surface 211a of the front substrate 211 and extend in a first direction to correspond to light-emitting cells 226, a front dielectric layer 215 covering the pairs of sustain electrodes 214, and a protective layer 216 disposed on the front dielectric layer 215.

The rear panel 220 includes: a rear substrate 221 which is parallel to the front substrate 211; address electrodes 222 which are disposed on a front surface 221a of the rear substrate 221 and extend in a second direction perpendicular to the first direction to cross the pairs of sustain electrodes 214; a rear dielectric layer 223 covering the address electrodes 222; barrier ribs 224 which are formed between the front substrate 211 and the rear substrate 221, wherein the barrier ribs 224 are disposed on the rear dielectric layer 223, and define the light-emitting cells 226; and red phosphor layers 225a, green phosphor layers 225b, and blue phosphor layers 225c, respectively formed of red phosphor, green phosphor, and blue phosphor that emit visible rays by being excited by ultraviolet rays emitted from a discharge gas generated due to sustain discharges occurring inside the light-emitting cells 226.

According an embodiment, the green phosphor layers 225b are prepared using a composition used to form a phosphor layer comprising the phosphor of Formula 1 as described above or a composition used to form a phosphor layer comprising the phosphor of Formula 1 as a first phosphor and at least one of the phosphors represented by Formula 2A, 2B, 3 or 4 as a second phosphor.

A method of preparing a phosphor layer using the composition used to form a phosphor layer according to the present embodiments will now be described according to a particular embodiment, but the present embodiments are not particularly limited to this method.

To easily print the phosphor according to the present embodiments, the phosphor can be mixed with a binder and a solvent to obtain a paste phase composition, and then the paste phase composition can be screen printed using a screen mesh. The printed composition is then dried and sintered to form a phosphor layer The drying temperature of the printed composition may be from about 100 to about 150° C., and the sintering temperature may be from about 350 to about 600° C., preferably about 450° C., to remove organic materials of the paste phase composition.

The binder can be ethyl cellulose, and the amount of the binder may be from about 10 to about 30 parts by weight based on 100 parts by weight of the phosphor. When the amount of the binder is less than 10 parts by weight based on 100 parts by weight of the phosphor, the binding force of the phosphor layer may decrease. On the other hand, when the amount of the binder is greater than 30 parts by weight based on 100 parts by weight of the phosphor, the amount of the phosphor in the phosphor layer is relatively low, and thus color purity of the phosphor layer may decrease.

The solvent can be butyl carbitol (BCA) or terpineol, and the amount of the solvent may be from about 70 to about 300 parts by weight based on 100 parts by weight of the phosphor. When the amount of the solvent is less than 70 parts by weight based on 100 parts by weight of the phosphor, the phosphor is insufficiently dispersed or the viscosity of the paste phase composition is such that printing is difficult. On the other hand, when the amount of the solvent is greater than 300 parts by weight based on 100 parts by weight of the phosphor, the amount of phosphor per unit area is too low and thus luminance of the PDP decreases.

The viscosity of the paste phase composition may be from about 5,000 to about 50,000 cps, preferably 20,000 cps. When the viscosity of the paste phase composition is less than 5,000 cps, the printing solution may leak out to adjacent light-emitting cells during a printing process, thus making it difficult to precisely form a printed layer at a desired location. On the other hand, when the viscosity of the paste phase composition is greater than 50,000 cps, the viscosity of the paste phase composition is so high that printing is difficult.

According to an embodiment, a phosphor layer for screen printing may be formed by mixing a phosphor and a vehicle with a weight ratio of about 40%:60% to perform printing, wherein the vehicle is prepared by mixing a mixture of terpinol and BCA, and ethylcellulose in a mixing weight ratio of 89.6:10.4, and then ethylcellulose is completely dissolved at a low temperature.

The red and blue phosphor layers 225a and 225c can be any red and blue phosphor layers that are conventionally used in the process of manufacturing a PDP. The red phosphor layer 225a can be formed of $(Y,Gd)BO_3$:Eu, $Y(V,P)O_4$:Eu or the like, and the blue phosphor layer 225c can be formed of $BaMgAl_{10}O_{17}$:Eu, $CaMgSi_2O_6$:Eu or the like.

In general, the front substrate 211 and the rear substrate 221 may be formed of glass. The front substrate 211 may have high visible light transmittance.

The address electrodes 222 which are disposed on the front surface 221a of the rear substrate 221 and extend in the second direction to correspond to the light-emitting cells 226 may be formed of a metal having high electrical conductivity, such as Al. The address electrodes 222 are used together with a Y 212 electrode to be described later to generate an address discharge in selected light-emitting cells 226 for emitting light. In the selected light-emitting cells 226 in which address discharge has occurred, a sustain discharge can subsequently occur.

The address electrodes 222 are covered by the rear dielectric layer 223, which prevents collision of the address electrodes 222 with charged particles that are generated during the address discharge, so that the address electrodes 222 can be protected. The rear dielectric layer 223 may be formed of a dielectric material capable of inducing discharged particles. The dielectric material can be for example, PbO, $B_2O_3$, $SiO_2$, or the like.

The barrier ribs 224 defining the light-emitting cells 226 are formed between the front substrate 211 and the rear substrate 221. The barrier ribs 224 secure a discharge space between the front substrate 211 and the rear substrate 221, prevent crosstalk between adjacent light-emitting cells 226, and enlarge the surface area of the red phosphor layers 225a, green phosphor layers 225b, and blue phosphor layers 225c. The barrier ribs 224 may be formed of a glass material including, for example, Pb, B, Si, Al, or O, and when required, the barrier ribs 224 may further include a filler, such as, for example, $ZrO_2$, $TiO_2$, and $Al_2O_3$, and a pigment, such as, for example, Cr, Cu, Co, Fe, or $TiO_2$.

The pairs of sustain electrodes 214 extend in the first direction to correspond to the light-emitting cells 226, perpendicular to the second direction in which the address electrodes 222 extend. Each of the pairs of sustain electrodes 214 includes an X electrode 213 and a Y electrode 212 that cause sustain discharge. The pairs of sustain electrodes 214 are disposed parallel to each other at predetermined intervals on the bottom surface 211a of the front substrate 211. The sustain discharge occurs due to a potential difference between the X electrodes 213 and the Y electrodes 212.

The X electrodes 213 and the Y electrodes 212 include transparent electrodes 213b and 212b and bus electrodes 213a and 212a, respectively. In some cases, however, the bus electrodes 213a and 212a can be solely used to form a scanning electrode and a common electrode.

The transparent electrodes 213b and 212b may be formed of a conductive and transparent material, so that the light emitted from the red phosphor layers 225a, green phosphor layers 225b, and blue phosphor layers 225c can be transmitted towards the front substrate 211 without being blocked. The conductive and transparent material used to form the transparent electrodes 213b and 212b can be, for example, indium tin oxide (ITO). However, since the conductive and transparent material, such as ITO, has a high resistance, and when the sustain electrodes 214 only comprise the transparent electrodes 213b and 212b, the sustain electrodes 214 have a large voltage drop in a lengthwise direction of the transparent electrodes 213b and 212b, the power consumption of the PDP increases and the response speed of images becomes slower. In order to prevent these problems, the bus electrodes 213a and 212a are formed of a highly conductive metal, such as Ag, and are formed on surfaces of the transparent electrodes 213b and 212b facing the rear panel 220, respectively.

The X electrodes 213 and the Y electrodes 212 are covered by the front dielectric layer 215. The front dielectric layer 215 electrically insulates the X electrodes 213 from the Y electrodes 212, and prevents collisions of charged particles with the X electrodes 213 and the Y electrodes 212, so that the sustain electrodes 214 are protected. The front dielectric layer 215 is formed of a dielectric material having high light transmittance, such as PbO, $B_2O_3$, $SiO_2$, or the like.

The protective layer 216 can be formed on the front dielectric layer 215. The front dielectric layer 215 prevents collisions of charged particles with the X electrodes 213 and the Y electrodes 212 during the sustain discharge so that the sustain electrodes 214 can be protected, and generates many secondary electrons during the sustain discharge. The protective layer 216 may be formed of MgO, for example.

The light-emitting cells 226 are filled with a discharge gas. The discharge gas can be, for example, a gaseous mixture of Ne and Xe in which the amount of Xe is from about 5 volume % to about 10 volume %. When needed, a part of Ne can be replaced with He.

The PDP according to the present embodiments has an afterglow time of about 1 ms or less, and preferably about 400 µs to about 1 ms. In addition, the color temperature of the PDP is approximately 8500 K, and the PDP has color (white) coordinates of (0.285,0.300).

The PDP of the present embodiments can have various structures in addition to the structure illustrated in FIG. 1.

The present embodiments will be described in further detail with reference to the following Examples. These examples are for illustrative purposes only and are not intended to limit the scope of the present embodiments.

SYNTHESIS EXAMPLE 1

Preparation of $(Y_{(1-x-y)}Gd_xTb_y)Al_3(BO_3)_4$ Where x=0.5 and y=0.2

$Y_2O_3$, $Gd_2O_3$, $Al_2O_3$, $H_3BO_3$ and $Tb_4O_7$ in a molar ratio of about 0.3:0.5:3:4:0.2 were mixed, and then the mixture was sintered under an air atmosphere at a temperature of 1150° C. for 5 hours to obtain a phosphor represented by $(Y_{(1-x-y)}Gd_xTb_y)Al_3(BO_3)_4$ where x=0.5, and y=0.2.

Figure 2:
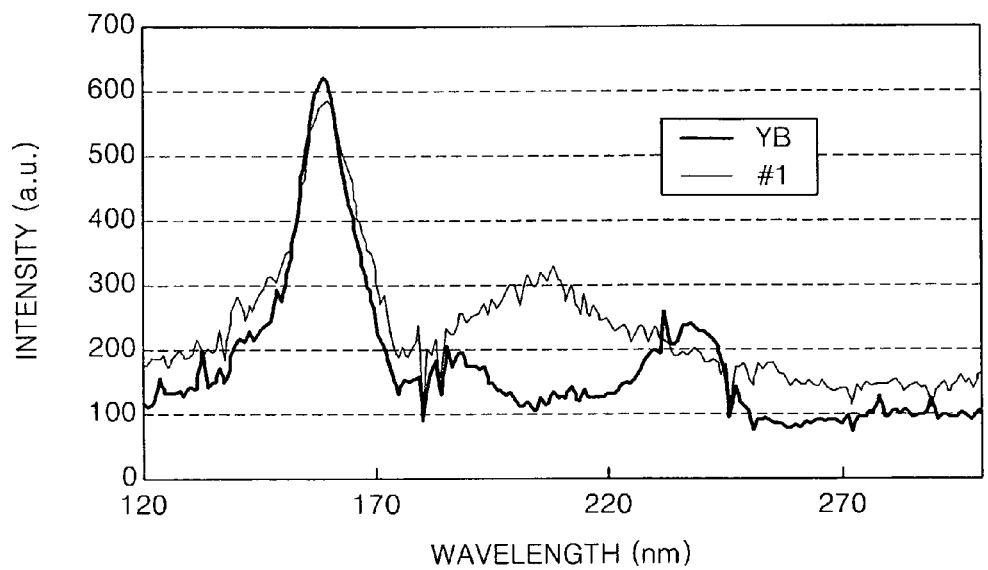
FIG. 2 is a graph showing an excitation spectrum of a phosphor when vacuum ultraviolet rays were irradiated to a phosphor according to an embodiment.

Vacuum ultraviolet rays were irradiated to the phosphor prepared in Synthesis Example 1 and a conventional green phosphor used in a PDP, YB(YBO$_3$:Tb), using an Excimer 146 nm lamp in a vacuum bath of 6.7 Pa (5×10$^{-2}$ torr) or less to measure excitation spectra and luminances of the phosphors, respectively. FIG. 2 is a graph showing an excitation spectrum of a phosphor when the vacuum ultraviolet rays were irradiated to the phosphor prepared in Synthesis Example 1.

Figure 3:
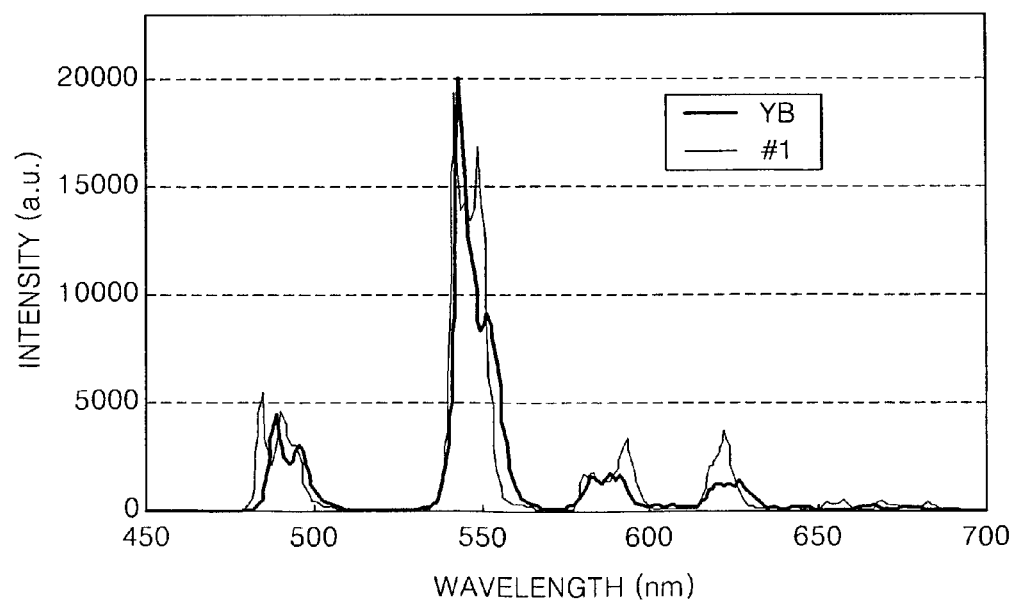
FIG. 3 is a graph showing luminance of a conventional phosphor and a phosphor according to an embodiment when vacuum ultraviolet rays were irradiated using an Excimer lamp operating at 146 nm.

FIG. 3 is a graph showing luminance of the conventional phosphor and the phosphor prepared in Synthesis Example 1 when the vacuum ultraviolet rays were irradiated. In FIGS. 2 and 3, YB refers to YB and #1 refers to the phosphor prepared in Synthesis Example 1.

Referring to FIG. 2, it can be seen that the phosphor of Synthesis Example 1 has the same fluorescence intensity as that of YB at an excitation of 147 nm, and has much higher fluorescence intensity than that of YB at an excitation of around 200 nm.

Referring to FIG. 3, it can be seen that the phosphor prepared in Synthesis Example 1 exhibits the same luminance as that of a conventional phosphor, YB.

SYNTHESIS EXAMPLE 2

Preparation of $(Y_{1-x-y}Gd_xTb_y)Al_3(BO_3)_4$ Where x=0.6 and y=0.3

$(Y_{(1-x-y)}Gd_xTb_y)Al_3(BO_3)_4$ where x=0.6 and y=0.3 was prepared in the same manner as in Synthesis Example 1, except that $Y_2O_3$, $Gd_2O_3$, $Al_2O_3$, $H_3BO_3$ and $Tb_4O_7$ in a molar ratio of about 0.1:0.6:3:4:0.3 were mixed.

SYNTHESIS EXAMPLE 3

Preparation of $(Y_{(1-x-y)}Gd_xTb_y)Al_3(BO_3)_4$ Where x=0.6 and y=0.4

$(Y_{(1-x-y)}Gd_xTb_y)Al_3(BO_3)_4$ where x=0.6 and y=0.4 was prepared in the same manner as in Synthesis Example 1, except that $Gd_2O_3$, $Al_2O_3$, $H_3BO_3$ and $Tb_4O_7$ in a molar ratio of about 0.6:3:4:0.4 were mixed.

SYNTHESIS EXAMPLE 4

Preparation of $BaMgAl_{10}O_{17}$:Mn $BaCO_3$, $Al_2O_3$, MgO and $MnCO_3$ in a molar ratio of about 1:1:10:17 were mixed, and then 40 parts by weight of pure water and alcohol as a solvent were added to the mixture. Subsequently, the resultant was sintered under a reducing atmosphere at a temperature of 1550° C. for 2 hours to obtain $BaMgAl_{10}O_{17}$:Mn.

SYNTHESIS EXAMPLE 5

Preparation of $Li_2Zn(Ge,Ga)_3O_8$:Mn $Li_2CO_3$, ZnO, $GeO_2$, $Ga_2O_3$ and $MnCO_3$ in a molar ratio of about 2:0.5:2.9:0.1:0.5 were mixed, and then 40 parts by weight of pure water and alcohol as a solvent was added to the mixture. Then the mixture was first sintered at a temperature of 900° C. for 2 hours. Subsequently, the resultant was second sintered under a nitrogen gas atmosphere containing 5 volume % of hydrogen at a temperature of 950° C. for 2 hours to obtain $Li_2Zn(Ge,Ga)_3O_8$:Mn.

SYNTHESIS EXAMPLE 6

Preparation of $(Y_{0.2}Gd_{0.4}Tb_{0.4})Al_3(BO_3)_4$ $(Y_{(1-x-y)}Gd_xTb_y)Al_3(BO_3)_4$ where x=0.6 and y=0.3 was prepared in the same manner as in Synthesis Example 1, except that $Y_2O_3$, $Gd_2O_3$, $Al_2O_3$, $H_3BO_3$ and $Tb_4O_7$ in a molar ratio of about 0.2:0.4:3:4:0.4 were mixed.

SYNTHESIS EXAMPLE 7

Preparation of $(Y_{0.2}Gd_{0.4}Tb_{0.4})Al_{2.95}Sc_{0.05}(BO_3)_4$ $Y_2O_3$, $Gd_2O_3$, $Al_2O_3$, $Sc_2O_3$, $H_3BO_3$, and $Tb_4O_7$ in a molar ratio of about 0.2:0.4:2.95:0.05:4:0.4 were mixed, and then pure water and alcohol as a solvent were added to the mixture and the mixture was mixed together. Then, the mixture was sintered under an air atmosphere at a temperature of 1150° C. for 5 hours to obtain a phosphor represented by $(Y_{0.2}Gd_{0.4}Tb_{0.4})Al_{2.95}Sc_{0.05}(BO_3)_4$.

SYNTHESIS EXAMPLE 8

Preparation of $(Y_{0.2}G_{0.4}Tb_{0.4})A_{2.9}Sc_{0.1}(BO_3)_4$ $(Y_{0.2}Gd_{0.4}Tb_{0.4})Al_{2.9}Sc_{0.1}(BO_3)_4$ was prepared in the same manner as in Synthesis Example 1, except that $Y_2O_3$, $Gd_2O_3$, $Al_2O_3$, $Sc_2O_3$, $H_3BO_3$, and $Tb_4O_7$ in a molar ratio of about 0.2:0.4:2.9:0.1:4:0.4 were mixed.

SYNTHESIS EXAMPLE 9

Preparation of $(Y_{0.2}Gd_{04}Tb_{0.4})Al_{2.8}Sc_{0.2}(BO_3)_4$ $(Y_{0.2}Gd_{0.4}Tb_{0.4})Al_{2.8}Sc_{0.2}(BO_3)_4$ was prepared in the same manner as in Synthesis Example 1, except that $Y_2O_3$, $Gd_2O_3$, $Al_2O_3$, $Sc_2O_3$, $H_3BO_3$, and $Tb_4O_7$ in a molar ratio of about 0.2:0.4:2.8:0.2:4:0.4 were mixed.

SYNTHESIS EXAMPLE 10

Preparation of $(Y_{0.2}Gd_{0.4}Tb_{0.4})Al_{2.5}Sc_{0.5}(BO_3)_4$ $(Y_{0.2}Gd_{0.4}Tb_{0.4})Al_{2.5}Sc_{0.5}(BO_3)_4$ was prepared in the same manner as in Synthesis Example 1, except that $Y_2O_3$, $Gd_2O_3$, $Al_2O_3$, $Sc_2O_3$, $H_3BO_3$, and $Tb_4O_7$ in a molar ratio of about 0.2:0.4:2.5:0.5:4:0.4 were mixed.

Figure 5:
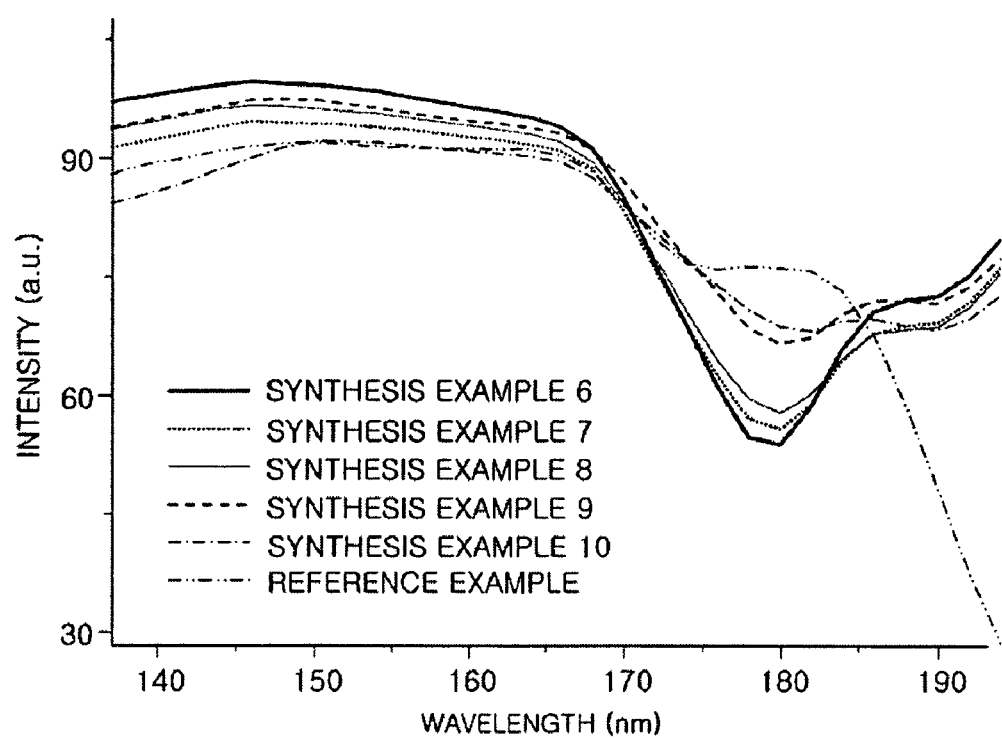
FIG. 5 is a graph showing measurement results of luminance of each of the phosphors prepared in Synthesis Examples 6 through 10 when a vacuum ultraviolet (VUV) ray is irradiated using the Excimer lamp operating at 146 nm.

FIG. 5 is a graph showing measurement results of luminance of each of the phosphors prepared in Synthesis Examples 6 through 10 when a vacuum ultraviolet (VUV) ray is irradiated using the Excimer lamp operating at 146 nm. In FIG. 5, Y refers to a phosphor prepared in Reference Example that will be described later.

EXAMPLE 1

A phosphor was prepared by mixing YGAB having the composition shown in Table 1 below as a first phosphor and $Li_2Zn(Ge,Ga)_3O_8$:Mn prepared in Synthesis Example 5.

40 parts by weight of the phosphor, 8 parts by weight of ethylcellulose as a binder and 52 parts by weight of terpineol as a solvent were mixed to prepare a composition used to form a green phosphor layer.

The composition used to form a green phosphor layer was screen printed in light-emitting cells of a PDP, and dried and sintered at a temperature of 480° C. to form a green phosphor layer. Here, a discharge gas in the PDP comprised 93 volume % of Ne and 7 volume % of Xe.

EXAMPLE 2

A phosphor was prepared by mixing YGAB having the composition shown in Table 2 below as a first phosphor and $BaMgAl_{10}O_{17}$:Mn prepared in Synthesis Example 4 as a second phosphor.

40 parts by weight of the phosphor, 8 parts by weight of ethylcellulose as a binder and 52 parts by weight of terpineol as a solvent were mixed to prepare a composition used to form a green phosphor layer.

The composition used to form a green phosphor layer was screen printed in light-emitting cells of a PDP, and dried and sintered at a temperature of 480° C. to form a green phosphor layer. Here, a discharge gas in the PDP comprised 93 volume % of Ne and 7 volume % of Xe.

REFERENCE EXAMPLE 40 parts by weight of a phosphor prepared by mixing P1 and $YBO_3$:Tb with a weight ratio of 80:20, 8 parts by weight of ethylcellulose as a binder and 52 parts by weight of terpineol as a solvent were mixed to prepare a composition used to form a green phosphor layer.

The relative luminances, color coordinates and afterglow times of the phosphor layers prepared in Examples 1 and 2, and Reference Example were measured using the following processes. Here, light-emitting cells were coated with the phosphor layers prepared in Examples 1 and 2 and the relative luminance of the phosphor in a powder form was measured under a Krypton 146 nm lamp.

The results of evaluating the luminance, color coordinate and afterglow properties are shown in Tables 1 and 2 below.

TABLE 1

In the case of $(Y_{1-x-y}Gd_xTb_y)Al_3(BO_3)_4$ where x = 0.6 and y = 0.4

| Phosphor composition | | Relative | | | |
|---|---|---|---|---|---|
| First phosphor | Second phosphor | Luminance** | CIE coordinate | | Afterglow |
| $(Y_{1-x-y}Gd_xTb_y)Al_3(BO_3)_4$ | $Li_2Zn(Ge, Ga)_3O_8$:Mn | (%) | x | y | time (ms) |
| 100 | 0 | 101 | 0.3362 | 0.5865 | 4.5 |
| 80 | 20 | 101.5 | 0.292 | 0.6232 | 5.2 |
| 60 | 40 | 102.3 | 0.2551 | 0.6541 | 5.8 |
| 40 | 60 | 103.4 | 0.2224 | 0.6809 | 6.5 |
| 20 | 80 | 104.4 | 0.1768 | 0.7184 | 7.3 |
| 0 | 100 | 105 | 0.1332 | 0.755 | 8.5 |
| Reference Example | | 100 | 0.2598 | 0.6884 | 7.6 |

TABLE 2

In the case of $(Y_{1-x-y}Gd_xTb_y)Al_3(BO_3)_4$ where x = 0.6 and y = 0.4

| Phosphor composition | | Relative | | | |
|---|---|---|---|---|---|
| First phosphor | Second phosphor | Luminance** | CIE coordinate | | Afterglow |
| $(Y_{1-x-y}Gd_xTb_y)Al_3(BO_3)_4$ | $BaMgAl_{10}O_{17}$:Mn | (%) | x | y | time (ms) |
| 100 | 0 | 101 | 0.3362 | 0.5865 | 5 |
| 80 | 20 | 101.5 | 0.292 | 0.6232 | 5.5 |
| 60 | 40 | 102.3 | 0.2551 | 0.6541 | 6.2 |
| 40 | 60 | 103.4 | 0.2224 | 0.6809 | 6.9 |
| 20 | 80 | 104.4 | 0.1768 | 0.7184 | 8 |
| 0 | 100 | 105 | 0.1332 | 0.755 | 9 |
| Reference Example | | 100 | 0.2598 | 0.6884 | 7.6 |

As can be seen from Tables 1 and 2, the phosphor layers of Examples 1 and 2 have improved relative luminance and color coordinate properties, and shorter afterglow time compared with the phosphor layer of Reference Example.

Figure 4:
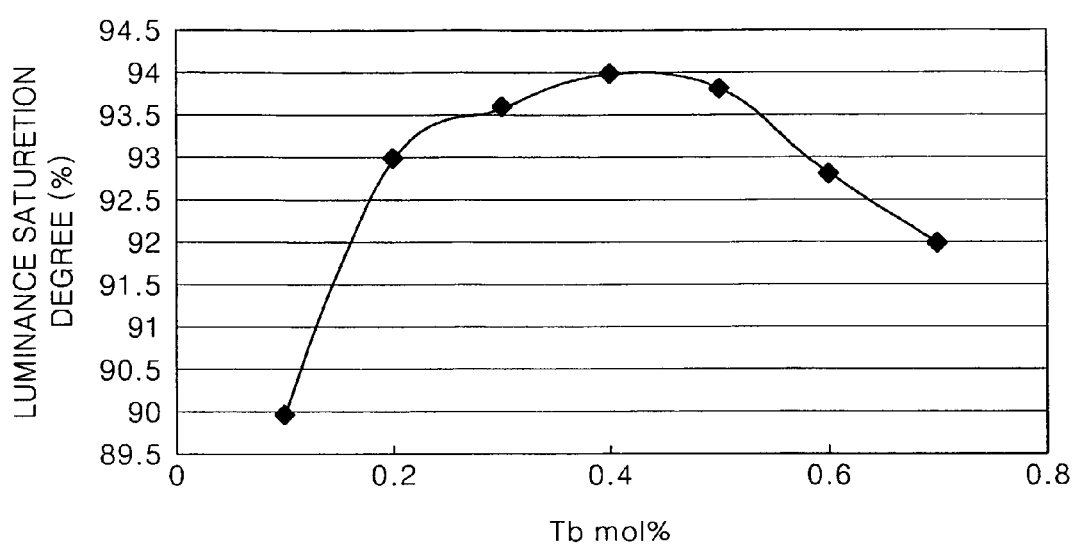
FIG. 4 is a graph showing the luminance saturation degree with respect to a change in the amount of Tb of a phosphor represented by Formula 1 according to an embodiment.

Meanwhile, FIG. 4 is a graph showing the luminance saturation degree with respect to a change in the amount of Tb of a phosphor of Formula 1 according to an embodiment, $(Y_{1-x-y}Gd_xTb_y)Al_3(BO_3)_4$.

Referring to FIG. 4, it can be seen that when the amount of Tb is 0.2-0.4 mole %, the phosphor of Formula 1 has a high luminance saturation degree. In particular, the amount of Tb may be most preferably 0.4 mole %.

EXAMPLE 3

A phosphor was prepared by mixing 80 parts by weight of each of YGBA prepared in Synthesis Examples 6 through 10 as a first phosphor and 20 parts by weight of $Li_2Zn(Ge,Ga)_3O_8$:Mn prepared in Synthesis Example 5 as a second phosphor according to the composition shown in Table 3 below.

40 parts by weight of the phosphor, 8 parts by weight of ethylcellulose as a binder and 52 parts by weight of terpineol as a solvent were mixed to prepare a composition used to form a green phosphor layer.

The composition used to form a green phosphor layer was screen printed in light-emitting cells of a PDP, and dried and sintered at a temperature of 480° C. to form a green phosphor layer. Here, a discharge gas in the PDP comprised 93 volume % of Ne and 7 volume % of Xe.

TABLE 3

| Phosphor composition | | Relative luminance |
|---|---|---|
| First phosphor | Second phosphor | (%) |
| $(Y_{0.2}Gd_{0.4}Tb_{0.4})Al_3(BO_3)_4$ | $Li_2Zn(Ge, Ga)_3O_8$:Mn | 100 |
| $(Y_{0.2}Gd_{0.4}Tb_{0.4})Al_{2.95}Sc_{0.05}(BO_3)_4$ | $Li_2Zn(Ge, Ga)_3O_8$:Mn | 100 |
| $(Y_{0.2}Gd_{0.4}Tb_{0.4})Al_{2.9}Sc_{0.1}(BO_3)_4$ | $Li_2Zn(Ge, Ga)_3O_8$:Mn | 101 |
| $(Y_{0.2}Gd_{0.4}Tb_{0.4})Al_{2.8}Sc_{0.2}(BO_3)_4$ | $Li_2Zn(Ge, Ga)_3O_8$:Mn | 112 |
| $(Y_{0.2}Gd_{0.4}Tb_{0.4})Al_{2.5}Sc_{0.5}(BO_3)_4$ | $Li_2Zn(Ge, Ga)_3O_8$:Mn | 108 |
| Reference Example | | 100 |

From the results shown in Table 3, it could be seen that the phosphors of Synthesis Examples 6 through 10 had improved relative luminance compared with the phosphor of Reference Example.

When the phosphor according to the present embodiments is used, the luminance saturation problem of a conventional green phosphor can be solved. In addition, a PDP including a phosphor layer comprising the phosphor has a wider color reproduction range and no reduction in luminance according to the mixing ratio of each phosphor contained in the phosphor layer compared with a conventional phosphor used in a PDP. Therefore, a PDP including a phosphor layer comprising the phosphor of the present embodiments can have far superior image qualities.

While the present embodiments have been particularly shown and described with reference to exemplary embodiments thereof, it will be understood by those of ordinary skill in the art that various changes in form and details may be made therein without departing from the spirit and scope of the present embodiments as defined by the following claims.

What is claimed is:

1. A phosphor configured for use in a PDP comprising:
   a first phosphor that is a compound represented by Formula 1 below; and
   a second phosphor comprising a phosphor represented by Formula 3 below.

$$(Y_{1-x-y}Gd_xTb_y)Al_rQ_{3-r}(BO_3)_4 \quad \text{Formula 1}$$

where $0<x\leq 1$, $0<y\leq 1$, Q is Sc, In, or Ga, and $0\leq r\leq 3$ $$Li_2Zn(Ge,\theta)_2O_8:Mn \quad \text{Formula 3}$$

where $\theta$=Al or Ga,
$3\leq Z\leq 4$.

2. The phosphor of claim 1, wherein the amount of the second phosphor is from about 10 to about 90 parts by weight based on 100 parts by weight of the total amount of the first phosphor and the second phosphor.

3. The phosphor of claim 1, wherein the compound represented by Formula 1 at least one selected from the group consisting of $(Y_{0.2}Gd_{0.4}Tb_{0.4})Al_{2.95}Sc_{0.05}(BO_3)_4$, $(Y_{0.2}Gd_{0.4}Tb_{0.4})Al_{2.9}Sc_{0.1}(BO_3)_4$, $(Y_{0.2}Gd_{0.4}Tb_{0.4})Al_{2.8}Sc_{0.2}(BO_3)_4$, $(Y_{0.2}Gd_{0.4}Tb_{0.4})Al_{2.5}Sc_{0.5}(BO_3)_4$, $(Y_{0.2}Gd_{0.4}Tb_{0.4})Al_{2.95}In_{0.05}(BO_3)_4$, $(Y_{0.2}Gd_{0.4}Tb_{0.4})Al_{2.9}In_{0.1}(BO_3)_4$, $(Y_{0.2}Gd_{0.4}Tb_{0.4})Al_{2.8}In_{0.2}(BO_3)_4$, $(Y_{0.2}Gd_{0.4}Tb_{0.4})Al_{2.5}In_{0.5}(BO_3)_4$, $(Y_{0.2}Gd_{0.4}Tb_{0.4})Al_{2.95}Ga_{0.05}(BO_3)_4$, $(Y_{0.2}Gd_{0.4}Tb_{0.4})Al_{2.9}Ga_{0.1}(BO_3)_4$, $(Y_{0.2}Gd_{0.4}Tb_{0.4})Al_{2.8}Ga_{0.2}(BO_3)_4$, and $(Y_{0.2}Gd_{0.4}Tb_{0.4})Al_{2.5}Ga_{0.5}(BO_3)_4$.

4. The phosphor of claim 1, wherein the phosphor represented by Formula 3 is $Li_2Zn(Ge,Al)_3O_8$:Mn or $Li_2Zn(Ge,Ga)_3O_8$:Mn.

5. A phosphor configured for use in a PDP comprising a first phosphor and a second phosphor wherein the first phosphor is $(Y_{0.3}Gd_{0.5}Tb_{0.2})Al_3(BO_3)_4$, $(Y_{0.1}Gd_{0.6}Tb_{0.3})Al_3(BO_3)_4$, or $(Gd_{0.6}Tb_{0.4})Al_3(BO_3)_4$, the second phosphor is a phosphor of Formula 2A or 2B below, and the amount of the second phosphor is from about 10 to about 90 parts by weight based on 100 parts by weight of the total amount of the first phosphor and the second phosphor $$BaMgAl_{10}O_{17}:Mn \quad \text{Formula 2A}$$

$$BaMgAl_{12}O_{19}:Mn. \quad \text{Formula 2B}$$

6. A PDP comprising a phosphor layer comprising a phosphor configured for use in a PDP comprising:
   a first phosphor that is a compound represented by Formula 1 below; and:
   a second phosphor comprising a phosphor represented by Formula 3 below:

$$(Y_{1-x-y}Gd_xTb)_yAl_rQ_{3-r}(BO_3)_4 \quad \text{Formula 1}$$

where $0<x\leq 1$, $0<y\leq 1$, Q is Sc, In, or Ga, and $0\leq r\leq 3$, $$Li_2Zn(Ge,\theta)_2O_8:Mn \quad \text{Formula 3}$$

wherein $\theta$=Al or Ga,
$3\leq Z\leq 4$.

7. The PDP of claim 6, wherein the amount of the second phosphor is from about 10 to about 90 parts by weight based on 100 parts by weight of the total amount of the first phosphor and the second phosphor.

8. The PDP of claim 6, wherein the compound represented by Formula 1 is at least one selected from the group consisting of $(Y_{0.3}Gd_{0.5}Tb_{0.2})Al_3(BO_3)_4$, $(Y_{0.1}Gd_{0.6}Tb_{0.3})Al_3(BO_3)_4$, $(Gd_{0.6}Tb_{0.4})Al_3(BO_3)_4$, $(Y_{0.2}Gd_{0.4}Tb_{0.4})Al_3(BO_3)_4$, $(Y_{0.2}Gd_{0.4}Tb_{0.4})Al_{2.95}Sc_{0.05}(BO_3)_4$, $(Y_{0.2}Gd_{0.4}Tb_{0.4})Al_{2.9}Sc_{0.1}(BO_3)_4$, $(Y_{0.2}Gd_{0.4}Tb_{0.4})Al_{2.8}Sc_{0.2}(BO_3)_4$, $(Y_{0.2}Gd_{0.4}Tb_{0.4})Al_{2.5}Sc_{0.5}(BO_3)_4$, $(Y_{0.2}Gd_{0.4}Tb_{0.4})Al_{2.95}In_{0.05}(BO_3)_4$, $(Y_{0.2}Gd_{0.4}Tb_{0.4})Al_{2.9}In_{0.1}(BO_3)_4$, $(Y_{0.2}Gd_{0.4}Tb_{0.4})Al_{2.8}In_{0.2}(BO_3)_4$, $(Y_{0.2}Gd_{0.4}Tb_{0.4})Al_{2.5}In_{0.5}(BO_3)_4$, $(Y_{0.2}Gd_{0.4}Tb_{0.4})Al_{2.95}Ga_{0.05}(BO_3)_4$, $(Y_{0.2}Gd_{0.4}Tb_{0.4})Al_{2.9}Ga_{0.1}(BO_3)_4$, $(Y_{0.2}Gd_{0.4}Tb_{0.4})Al_{2.8}Ga_{0.2}(BO_3)_4$, and $(Y_{0.2}Gd_{0.4}Tb_{0.4})Al_{2.5}Ga_{0.5}(BO_3)_4$.

9. The PDP of claim 6, wherein the phosphor represented by Formula 3 is $Li_2Zn(Ge,Al)_3O_8$:Mn or $Li_2Zn(Ge,Ga)_3O_8$:Mn.

10. A PDP comprising a phosphor layer comprising a phosphor configured for use in a PDP comprising: a first phosphor and a second phosphor, wherein the first phosphor is $(Y_{0.3}Gd_{0.5}Tb_{0.2})Al_3(BO_3)_4$, $(Y_{0.1}Gd_{0.6}Tb_{0.3})Al_3(BO_3)_4$, or $(Gd_{0.6}Tb_{0.4})Al_3(BO_3)_4$ the second phosphor is a phosphor of Formula 2A or 2B:

$$BaMgAl_{10}O_{17}:Mn \qquad \text{Formula 2A}$$

$$BaMgAl_{12}O_{19}:Mn; \text{ and} \qquad \text{Formula 2B}$$

wherein the amount of the second phosphor is from about 10 to about 90 parts by weight based on 100 parts by weight of the total amount of the first phosphor and the second phosphor.

* * * * *